United States Patent
Iwasa et al.

(10) Patent No.: US 8,408,873 B2
(45) Date of Patent: Apr. 2, 2013

(54) WELDING SLOT SEALING STRUCTURE AND WELDING METHOD

(75) Inventors: Masaaki Iwasa, Hitachinaka (JP); Takeshi Tsukamoto, Hitachinaka (JP); Hideto Nogiwa, Tsukuba (JP); Tetsuya Kuwano, Tsuchiura (JP); Yoshihisa Maeda, Tsuchiura (JP); Hiromi Kobayashi, Kasumigaura (JP); Ryujiro Udo, Ushiku (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 1471 days.

(21) Appl. No.: 12/018,527

(22) Filed: Jan. 23, 2008

(65) Prior Publication Data

US 2008/0237195 A1    Oct. 2, 2008

(30) Foreign Application Priority Data

Mar. 27, 2007    (JP) ................................. 2007-080457

(51) Int. Cl.
*F01D 5/20*    (2006.01)
*F04D 29/30*    (2006.01)
(52) U.S. Cl. ............ 416/186 R; 416/213 R; 416/229 R; 29/525.14; 29/889.7
(58) Field of Classification Search .............. 416/186 R, 416/213 R, 229 R, 230, 229 A; 29/525.14, 29/889.7
See application file for complete search history.

(56) References Cited

U.S. PATENT DOCUMENTS

| 3,761,201 | A | * | 9/1973 | Silverstein et al. ........... 416/232 |
| 4,302,657 | A | * | 11/1981 | Turelli et al. ............... 219/137 R |
| 5,735,672 | A | * | 4/1998 | Mrotek ....................... 416/213 A |
| 5,839,882 | A | * | 11/1998 | Finn et al. .................. 416/229 A |
| 5,931,641 | A | * | 8/1999 | Finn et al. .................. 416/229 A |
| 7,278,830 | B2 | * | 10/2007 | Vetters ....................... 416/229 R |

FOREIGN PATENT DOCUMENTS

| JP | 48-1632 | | 1/1973 |
| JP | 60-58881 | | 4/1985 |
| JP | 63-26285 | | 2/1988 |
| JP | 64-034590 | | 2/1989 |
| JP | 05-372 | | 1/1993 |
| JP | 05-202701 | | 8/1993 |
| JP | 06079446 | A * | 3/1994 |
| JP | 6-272696 | | 9/1994 |

OTHER PUBLICATIONS

JP Search Report of Appln. No. 2007-080457 dated Jun. 9, 2009.

* cited by examiner

*Primary Examiner* — Edward Look
*Assistant Examiner* — Jesse Prager
(74) *Attorney, Agent, or Firm* — Antonelli, Terry, Stout & Kraus, LLP.

(57) ABSTRACT

Blades are connected to the surface of a disk and slots are formed in the surface of a shroud, which is opposite from the other surface of the shroud where the blades are to be welded. The blades are arranged on the opposite surface from the slots and a laser beam is applied from the surface in which the slots are formed, to weld the shroud and the blades. Components are installed on the surfaces of the slots on the opposite side from the blades after the blades and the shroud in which the slots are formed are welded. Alternatively, the slots are filled with a material different from that of the shroud, such as a resin. With this configuration, distortion caused by welding heat can be reduced without degrading the fluid performance.

4 Claims, 6 Drawing Sheets

WELDING SLOT SEALING STRUCTURE AND WELDING METHOD

BACKGROUND OF THE INVENTION

The present invention relates to a welding slot sealing structure and its welding method.

For an impeller attached to a centrifugal compressor or the like, welding is generally used when a blade is joined to a shroud. In manufacturing the impeller by welding, the height and shape of blade are restricted.

For example, to manufacture an impeller that cannot be reached by hand and can not be welded, such liquid phase diffusion bonding as described in JP-A-5-202701 and JP-A-6-272696 may be used. Also, when an intricately-shaped impeller is manufactured, laser slot welding may be performed.

In these welding processes, a shroud or a disk, to which the blade is welded, is formed with a slot in the surface on the opposite side from the blade, and a laser beam is applied from the slot side to melt and weld the shroud or disk and the blade. This method, however, requires overlaying work such that the slot is filled with powder, which is melted by the laser beam applied while the powder is being charged, after the blade has been welded to the shroud or the disk. This is because the fluid performance of impeller is degraded remarkably if the slot is left as it is.

According to the above-described related art, when the slot, which has been formed in the shroud or the disk to perform laser welding, is filled by overlaying after the blade has been welded to the shroud or the disk with the laser beam, thermal distortion may be caused by the overlaying. Also, if the slot is left as it is, a problem of degraded fluid performance arises.

BRIEF SUMMARY OF THE INVENTION

An object of the invention is to provide a welding slot sealing structure and its welding method for a centrifugal compressor and the like, which can reduce thermal distortion without degrading the fluid performance.

The above object is achieved by a welding slot sealing structure for an impeller having a round disk, a plurality of blades attached radially at a predetermined angle to a surface of the disk, and a shroud attached to outer edges of the blades, in which slots are formed in a surface of the shroud, and the blades are brought into contact with an opposite surface of the shroud from the slots and the shroud and the blades are welded by a laser beam applied from surfaces of the slots, wherein after the shroud and the blades have been laser-welded, components different from the shroud are installed on the surfaces of the slots on the opposite side from the blades so that the slots become flush with the shroud.

To achieve the above object, after the shroud has been laser-welded to the blades, the slots may be filled part way, and then the components different from the shroud may be installed on the surfaces of the slots.

To achieve the above object, the components different from the shroud may be welded to the shroud.

To achieve the above object, the components different from the shroud may be fixed to the shroud with bolts.

To achieve the above object, the components different from the shroud may be fixed to the shroud by brazing.

Also, the above object is achieved by a welding slot sealing structure for an impeller having a round disk, a plurality of blades attached radially at a predetermined angle to a surface of the disk, and a shroud attached to outer edges of the blades, in which slots are formed in a surface of the shroud, and the blades are brought into contact with an opposite surface of the shroud from the slots and the shroud and the blades are welded by a laser beam applied from surfaces of the slots, wherein the slots formed in the shroud are sealed by a resin.

To achieve the above object, an upper part of the resin may be covered with a component different from the shroud.

To achieve the above object, a resin material for sealing the slots may be fiber reinforced plastics.

Also, the above object is achieved by a welding slot sealing structure for an impeller having a round disk, a plurality of blades attached radially at a predetermined angle to a surface of the disk, and a shroud attached to outer edges of the blades, in which slots are formed in a surface of the shroud, and the blades are brought into contact with an opposite surface of the shroud from the slots and the shroud and the blades are welded by a laser beam applied from surfaces of the slots, wherein the slots formed in the shroud are sealed by a material made by mixing a metal and a brazing filler.

To achieve the above object, an upper part of the material obtained by mixing the metal with the brazing filler may be covered with a component different from the shroud.

Also, the above object is achieved by a welding method for an impeller having a round disk, a plurality of blades attached radially at a predetermined angle to a surface of the disk, and a shroud attached to outer edges of the blades, in which slots are formed in a surface of the shroud, and the blades are brought into contact with an opposite surface of the shroud from the slots and the shroud and the blades are welded by a laser beam applied from surfaces of the slots, which welding method comprises the steps of forming the slots in the surface opposite to the surface of the shroud with which the blades are brought into contact, melting the blades by applying the laser beam to the slots to weld them to the shroud, performing overlaying by charging powder in the slots and melting it by the laser beam, grinding and finishing the overlaid surface into a surface flush with the shroud.

According to the invention, there can be provided the welding slot sealing structure and the welding method for a centrifugal compressor and the like, which can reduce thermal distortion without degrading the fluid performance.

Other objects, features and advantages of the invention will become apparent from the following description of the embodiments of the invention taken in conjunction with the accompanying drawings.

DETAILED DESCRIPTION OF THE INVENTION

The embodiments of the invention will now be described by reference to the accompanying drawings.

By the way, for impellers of centrifugal compressors and the like, there are a closed type in which a shroud is attached to the outer peripheral side of blades attached to a disk and an open type in which no shroud is provided. In the open type, in welding the blades to the disk, arc welding etc. can be used because no shroud is provided and therefore the hands of a welding worker reach the entire length of the blades.

However, the closed type has a problem that since the shroud is provided, arc welding can not be made, not only in welding the blades and the disk, but also in welding the blades and the shroud because the hand of a welding worker do not reach them. This problem commonly arises not only in centrifugal pumps but also in pumps and water turbines.

In achieving the present invention, various structures have been considered for closing the slots formed for welding on the shroud side after the shroud and the blades have been welded by the laser beam, and as a result the embodiments as will be described below are obtained.

In the embodiments, description will be given of a configuration in which the shroud is leaser-welded to the blades in an impeller in which the blades and the disk are integrally processed. However, the invention can be applied to the case where, contrary to the above-described configuration, the blades and the shroud are formed integrally and the disk and the blades are laser-welded.

First, the configuration of a general compressor impeller will be explained with reference to FIGS. 1 and 2.

Figure 1:
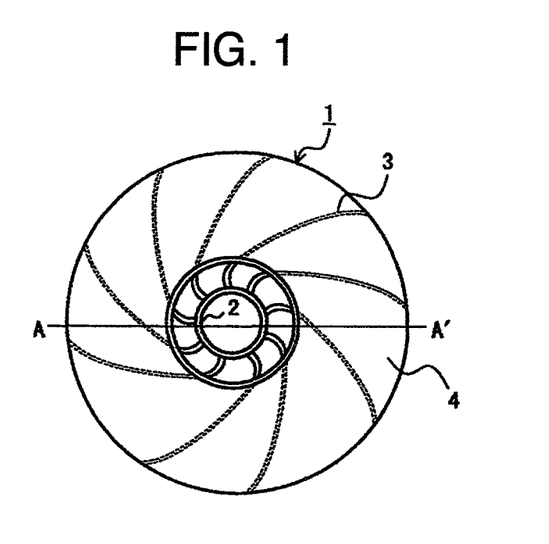
FIG. 1 is a top view of a general impeller.

FIG. 1 is the top view of the general impeller for a centrifugal compressor.

Figure 2:
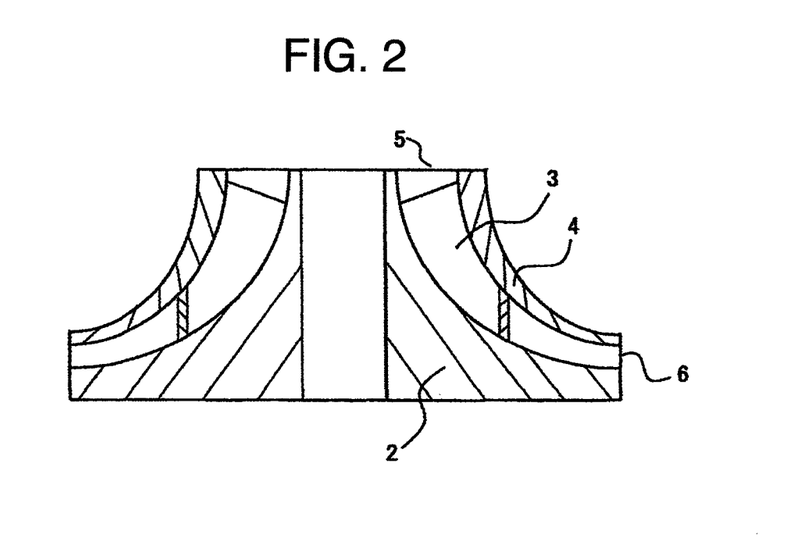
FIG. 2 is a sectional view taken along the line A-A' of FIG. 1.

FIG. 2 is the sectional view taken along the line A-A' of FIG. 1.

In FIGS. 1 and 2, reference numeral 1 denotes the whole of the impeller. The plurality of blades 3 are welded in a radial manner to the disk 2 (shown in FIG. 2), which serves as a rotating shaft. By the rotation of the blades 3, a gas sucked through an impeller eye 5 shown in FIG. 2 is compressed and discharged to a blade outlet 6 by centrifugal force, and is sent from here to predetermined external equipment. Reference numeral 4 denotes the shroud, which is welded to the blades 3 themselves so as to cover the blades 3.

The blades 3 may be provided on the disk 2 by machining etc. Alternatively, after the disk 2 and the blades 3 have respectively been machined into predetermined shapes, the disk 2 and the blades 3 may be welded to each other. After the blades 3 have been installed on the disk 2, the blades 3 are welded to the shroud 4. The welding at this time is laser welding.

It is assumed that the impeller 1 explained in the embodiments has a diameter of about 300 mm, and the slots which will be described later have a width of about 10 mm.

Embodiment 1

The laser welding of the blades and the shroud in accordance with the first embodiment will be described with reference to FIGS. 3 and 4.

Figure 3:
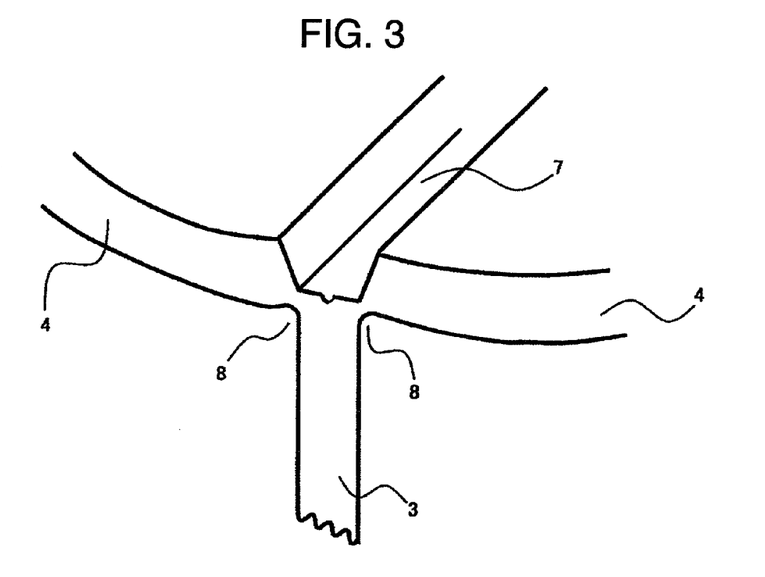
FIG. 3 is an enlarged perspective view of a welded part between a shroud and a blade.

FIG. 3 is the perspective view of the blade and the shroud, which have been welded to each other. FIG. 4 is the partial sectional view of a welded part between the blade attached to the disk and the shroud.

Figure 4:
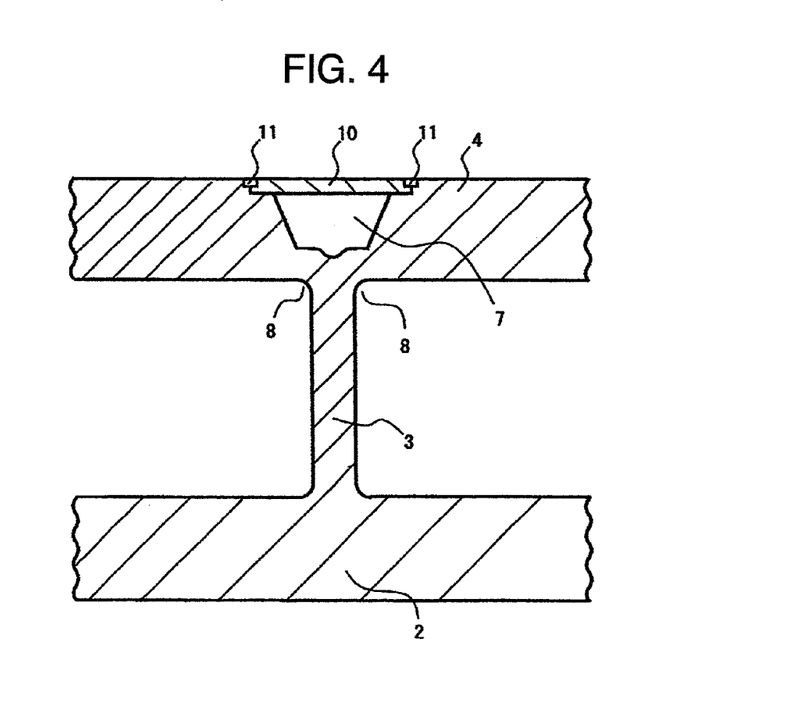
FIG. 4 is a sectional view of a welded part of a first embodiment.

In FIGS. 3 and 4, the slot 7 is provided in the shroud 4 on the opposite side from the blade 3 that is fixed to the disk 2 and brought into contact with the shroud 4. The blade 3 and the shroud 4 are welded to each other by applying a laser beam from the direction of the slot 7. The width of the slot 7 is preferably slightly larger than the thickness of the blade 3. By applying the laser beam from the surface of the shroud 4 in which the slot 7 is formed, the shroud 4 and the blade 3 are melted and integrated. Reference numeral 8 denotes a fillet formed by the welding of the blade 3 and the shroud, that is, a rounded part formed at a corner.

After the blade 3 and the shroud 4 have been welded to each other in this manner, overlaying of the slot 7 is not performed, and a component 10 different from the shroud 4 is provided so as to cover the slot 7 in the shroud 4. The component 10 corresponds to what is called a lid. By covering the slot 7 with the component 10 (lid), the slot 7 is made flush with the shroud 4. As will be explained with reference with FIG. 5, grooves 9 for installing the component 10 are formed on the slot surface side of the shroud 4, which is on the opposite side from the blade 3. Reference numeral 11 denotes a welded part between the component 10 and the shroud 4.

The grooves 9 are formed before the shroud 4 is laser-welded to the blade 3. After the shroud 4 has been laser welded to the blade 3, however, the shroud 4 is distorted, and in some cases, the component 10 cannot be fit in the grooves 9. In this case, the grooves 9 are re-formed so that the component 10 can be fitted. After the component 10 has been installed in the grooves 9, the shroud 4 and the component 10 are welded to each other by arc welding etc. to from a welding 11. In the case of welding, the component 10 is made of a metal, and may be made of a material that is the same as or different from that of the shroud 4. By covering the slot 7 with the component 10 in this manner, the degradation of fluid performance is eliminated. Further, thermal distortion caused by overlaying can be eliminated.

Embodiment 2

The second embodiment of the invention is explained with reference to FIGS. 5 and 6.

Figure 5:
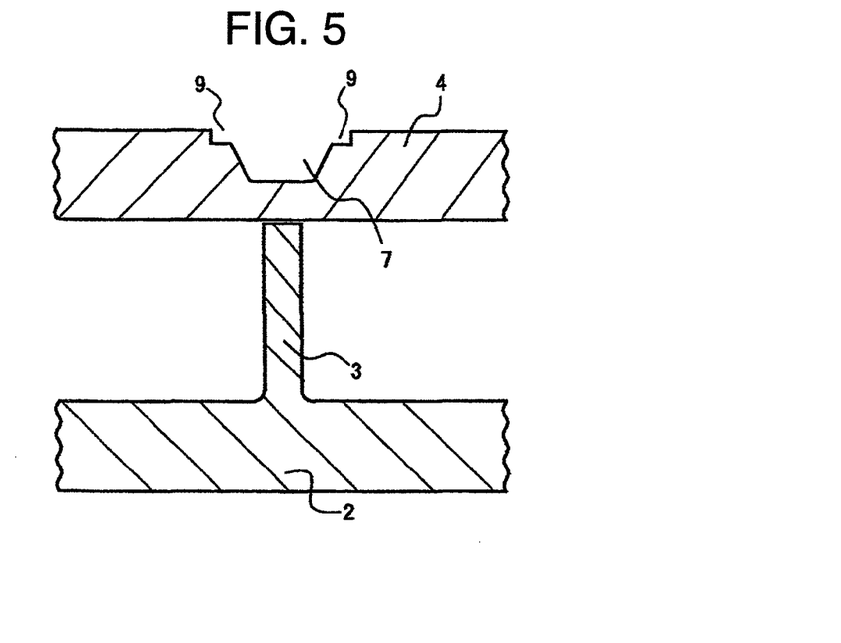
FIG. 5 is a sectional view of a welded part showing the structure of a blade and a disk before laser welding.

FIG. 5 is the sectional view showing the state of the slot before the component is installed.

Figure 6:
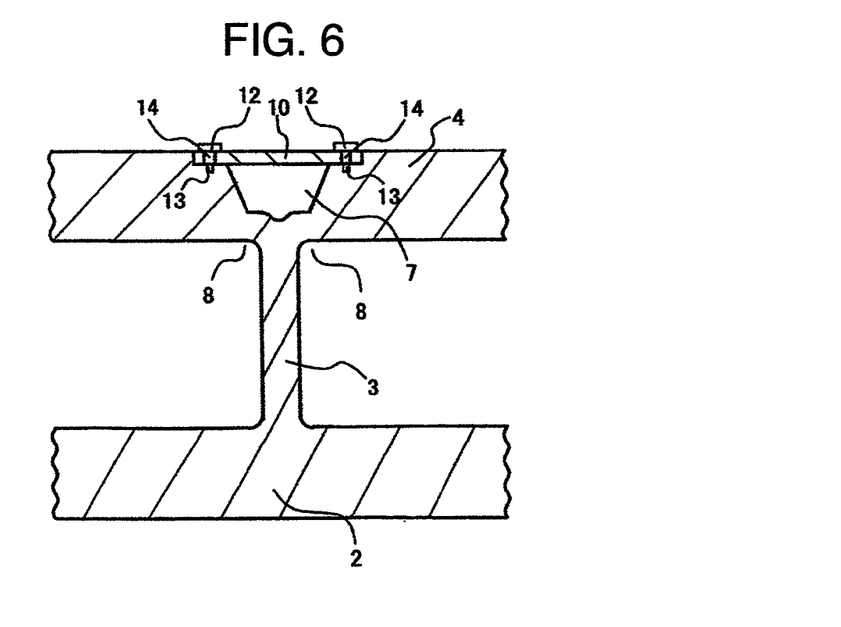
FIG. 6 is a sectional view of a welded part of a second embodiment.

FIG. 6 is the sectional view showing the state of the slot after the component has been installed.

In FIGS. 5 and 6, the embodiment employs a method of fixing the component 10 for sealing the slot 7 by using bolts 12, not by welding. After the shroud 4 has been laser-welded to the blade 3, the component 10 is fitted in the grooves 9, which are located on the opposite side of the shroud from the blade 3 and formed on the opposite corners of the slot 7. In the lower surface of the groove 9, internal threads 13 are formed in advance. Also, in the component 10, holes 14 each having a diameter slightly larger than the bolt diameter are formed in advance.

The holes 14 are formed in the component 10 so that the bolts 12 are fitted at the internal thread positions in the groove 9 through the holes 14 in the component 10. The component 10 is fixed to the shroud 4 with the bolts 12. If the shroud 4 is scarcely distorted thermally after the shroud 4 has been laser-welded to the blade 3, the grooves 9 and the internal threads 13 may be formed before the welding. However, when the shroud 4 is thermally distorted greatly by the welding, the grooves 9 and the internal threads 13 are formed after the welding. By fixing the component 10 to the shroud 4 with the bolts 12, thermal distortion caused by the welding of the component 10 to the shroud 4 can be eliminated.

Embodiment 3

The other embodiment of the invention will be described with reference to FIG. 7.

Figure 7:
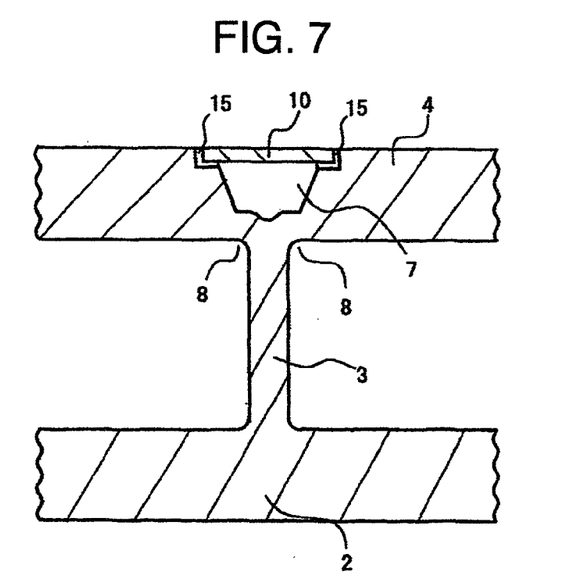
FIG. 7 is a sectional view of a welded part of a third embodiment.

FIG. 7 is the sectional view showing the state of the slot after the component has been installed.

This embodiment employs a method of fixing the component 10 for sealing the slot 7 by brazing. A brazing filler is placed between the component 10 and the shroud 4. Then, the whole of the impeller 1 is heated to a predetermined temperature at which the brazing filler 15 melts. The melting of the brazing filler 15 makes the shroud 4 and the component 10 integral, by which the slot 7 formed in the shroud 4 can be sealed. As the brazing filler 15, a nickel-based or a gold-based metal is often used. Although the brazing filler is used in this embodiment, an adhesive can also be used. Brazing or bonding can reduce work man-hour as compared with the work of welding or fastening bolts.

Embodiment 4

Figure 8:
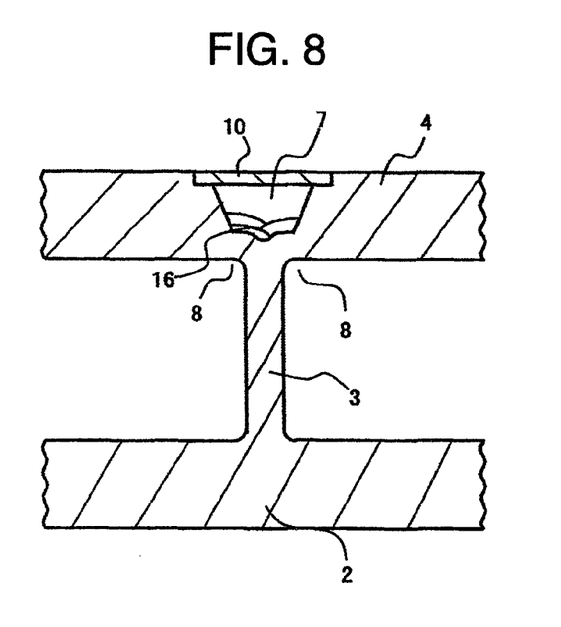
FIG. 8 is a sectional view of a welded part of a fourth embodiment.

The other embodiment of the invention will be described with reference to FIG. 8.

This embodiment employs a method of performing overlaying the middle of the slot depth, after the shroud 4 and the blade 3 have been laser-welded, and sealing the slot 7 by the component 10. The overlaying is performed several times to fill the slot 7 gradually with the welds, and the overlaying work stops part way without completely filling the slot 7.

By stopping the overlaying work part way, the thermal distortion of the shroud 4 can be restrained as compared with the case where the slot 7 is filled completely with the welds of overlaying 16. Further, the strength of the shroud 4 can be increased as compared with the case where the slot 7 is not filled at all. After the slot 7 has been filled part way with the welds of overlaying 16, the component 10 is installed in the grooves formed in the surface of the shroud 4 on the opposite side from the blade 3. The component 10 is fixed to the shroud 4 by the method described in any one of embodiments 1 to 3.

Embodiments 5

Figure 9:
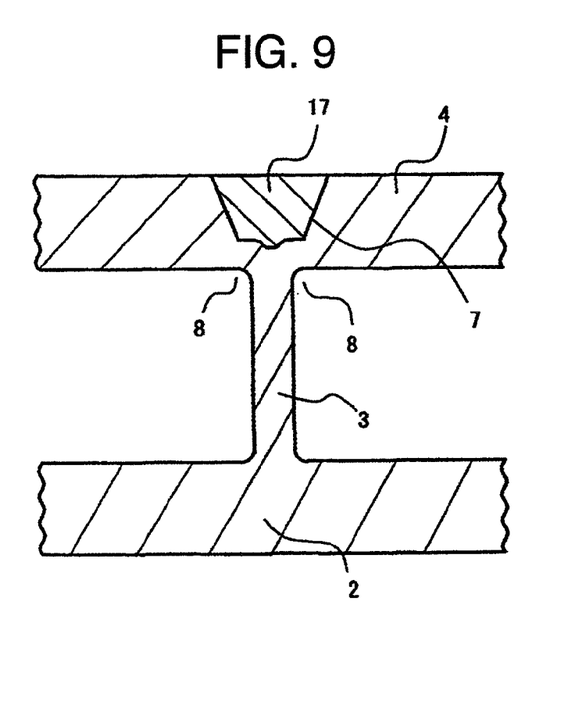
FIG. 9 is a sectional view of a welded part of a fifth embodiment.

The other embodiment of the invention will be described with reference to FIG. 9.

This embodiment employs a method of filling the slot 7 formed in the shroud 4 with a resin 17. The blade 3 and the shroud 4 are welded by the laser beam in the same way as in embodiment 1. After the welding, the resin 17 is put in the slot 7. When unsaturated polyester resin is used as the resin 17, the resin 17 can be cured at the room temperature.

Also, when a heat-curable resin such as epoxy resin is used, the whole of the impeller 1 is heated to the curing temperature of the resin. The resin 17 is preferably put in the slot 7 in a rather larger amount to such an extent that the resin 17 swells out of the upper part of the slot 7. After the resin 17 has cured, the resin swelling out of the slot 7 is scraped with a tool such as a cutter. The complete filling of the slot 7 with the resin can increase the strength of the shroud 4 as compared with the case where the slot 7 is left empty.

Embodiment 6

Figure 10:
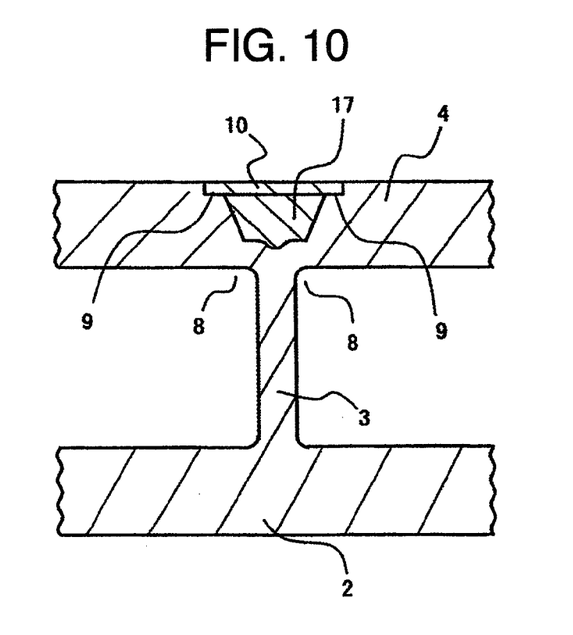
FIG. 10 is a sectional view of a welded part of a sixth embodiment.

The other embodiment of the invention will be described with reference to FIG. 10.

This embodiment employs a method of filling the slot 7 formed in the shroud 4 with the resin 17 and then installing the component 10 on the resin 17. The blade 3 and the shroud 4 are welded in the same way as in embodiment 1. The slot 7 is filled with the resin 17 after the welding. As the resin 17 used at this time, the aforementioned unsaturated polyester resin capable of being cured at the room temperature or the aforementioned heat-curable epoxy resin is used.

At this time, the resin 17 should be poured to the position of the grooves formed in the surface of the shroud 4 on the opposite side from the blade 3. Then, the resin 17 swelling out from the slot 7 to the grooves 9 is scraped so that the component 10 is fitted in the grooves 9. In this state, the component 10 is fixed to the shroud 4 by welding, brazing, screwing, or bonding. By installing the component 10 on the upper part of the resin in this manner, the deformation of the slot 7 at the time of impeller rotation can be reduced as compared with the case where the slot 7 is merely filled with the resin.

In this embodiment and embodiment 5, the slot 7 is filled with the resin. However, the slot 7 may be filled with a material obtained by mixing a metal and a brazing filler in place of the resin. The material obtained by mixing the metal with the brazing filler has a higher mechanical property such as Young' modulus than the resin, and therefore can reduce the deformation of the slot at the time of impeller rotation as compared with the case where the slot is filled with the resin.

Embodiment 7

Figure 11:
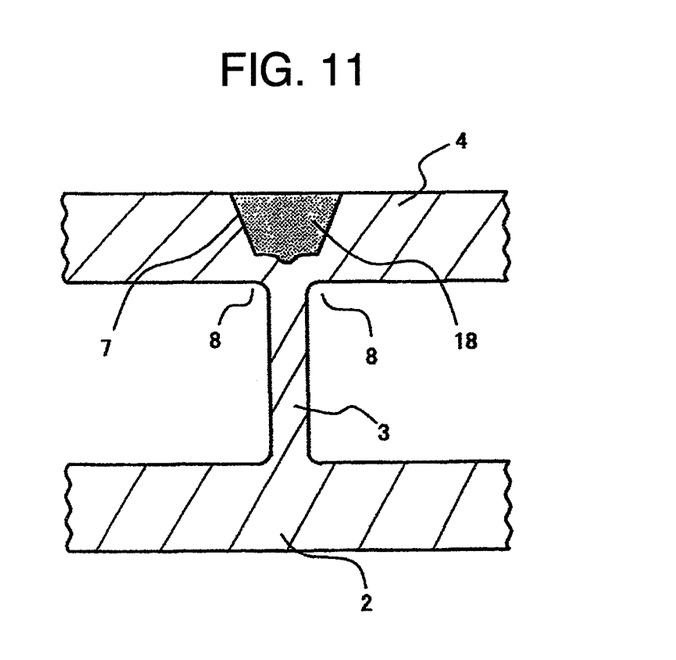
FIG. 11 is a sectional view of a welded part of a seventh embodiment.

The other embodiment of the invention will be described with reference to FIG. 11.

This embodiment employs a method of filling the slot 7 in the shroud 4 with fiber reinforced plastics. After the blade 3 and the shroud 4 have been welded by the laser beam, the slot 7 is filled with the fiber reinforced plastics 18. As the fiber reinforced plastics 18, plastics in which whiskers or short fibers are dispersed may be used, or a plurality of sheets called prepreg may be laminated. The prepreg sheet is a sheet in which fibers are oriented in one direction in plastics. Further, there is a way of placing a sheet called a glass mat in the slot 7 and then impregnating it with unsaturated polyester resin.

As the fibers, glass, carbon, alumina, and the like can be cited, and as the plastics, unsaturated polyester resin, epoxy resin, and the like can be cited. Further, as in embodiment 6, the component 10 may be installed on the fiber reinforced plastics. Since the fiber reinforced plastics have a higher mechanical property such as Young' modulus than the resin, the deformation of the slot at the time of impeller rotation can be reduced as compared with the case where the slot is filled with the resin. Also, whereas the melting temperature of the brazing filler is usually as high as about 1000° C., the curing temperature of epoxy resin is about 100 to 300° C., so that the thermal distortion can be reduced.

It should be further understood by those skilled in the art that although the foregoing description has been made on the embodiments of the invention, the invention is not limited thereto and various changes and modifications may be made without departing from the spirit of the invention and the scope of the appended claims.

The invention claimed is:

1. A welding slot sealing structure for an impeller having a round disk, a plurality of blades attached radially at a predetermined angle to a surface of the disk, and a shroud attached to outer edges of the blades, in which slots are formed in a surface of the shroud, the blades are brought into contact with an opposite surface of the shroud from the slots and the shroud and the blades are welded by applying a laser beam from surfaces of the slots, wherein after the blades have been laser-welded to the shroud, components different from the shroud are installed on the surfaces of the slots on the opposite side from the blades so that the slots are flush with the shroud,
wherein after the blades and the shroud have been laser-welded, the slots are filled part way, and the slots are sealed with the components different from the shroud on the surfaces of the slots, and
wherein the components different from the shroud comprise overlays and lids, the slots are filled part way with the overlays, and the lids cover the slots.

2. The welding slot sealing structure according to claim 1, further comprising a gap in each of the slots, the gap being between an overlay of the overlays and a lid of the lids.

3. The welding slot sealing structure according to claim 1, wherein the lids are flush with the surface of the shroud.

4. A welding slot sealing structure for an impeller comprising:
a round disk;
a plurality of blades attached radially at a predetermined angle to a surface of the round disk;
a shroud having an attachment surface and an outer surface, the attachment surface being on an opposite side of the shroud from the outer surface, slots being formed in the outer surface, welds attaching outer edges of the blades to regions of the attachment surface corresponding to the slots in the outer surface; and
components different from the shroud disposed in the slots, each slot being sealed flush with the outer surface of the shroud by a lid of the components different from the shroud, and each slot having a gap formed under the lid,
wherein an overlay of the components different from the shroud is disposes in each of the slots, and the gap of each slot being formed between the overlay and the lid.

\* \* \* \* \*